J. CROSS.
Hulling Machine.
No. 968.
Patented Oct. 8, 1838.
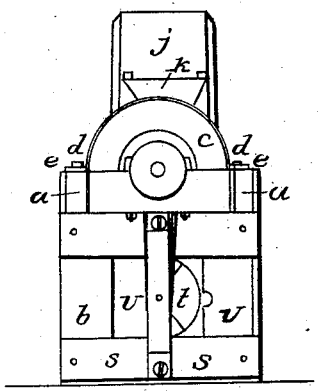
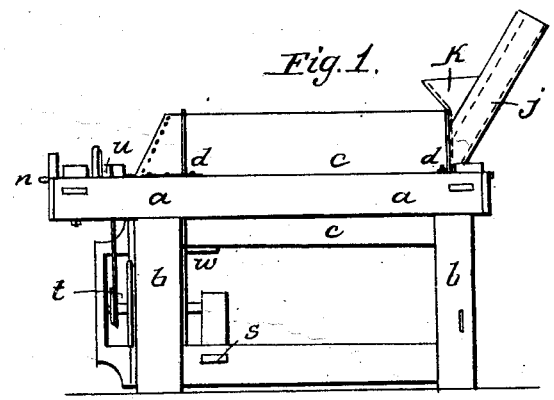
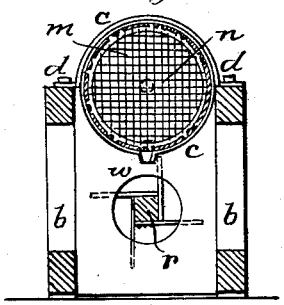
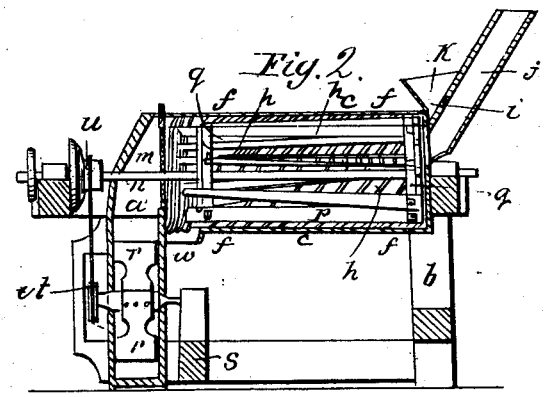
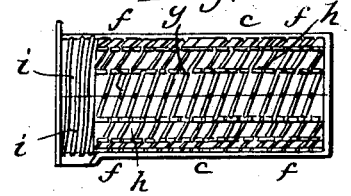

UNITED STATES PATENT OFFICE.

JEDUTHAN CROSS, OF CENTER LISLE, NEW YORK.

MACHINE FOR HULLING AND CLEANING GRAIN.

Specification of Letters Patent No. 968, dated October 8, 1838.

*To all whom it may concern:*

Be it known that I, JEDUTHAN CROSS, of Center Lisle, in the county of Broome and State of New York, have invented a new and useful Improvement in Machines for Hulling and Cleaning Grain; and I do hereby declare the following to be a full and exact description thereof, reference being had to the drawings annexed and making part of said description.

Figure 1, in said drawings represents a side view. Fig. 2, a longitudinal section. Fig. 3, an end view. Fig. 4, a transverse section. Fig. 5, a section showing the interior of the cylinder.

$a$ $a$ and $b$ $b$, Figs. 1, 2, 3 and 4 represent the frame of the machine made of a convenient size and in the usual manner of the frames of machines for this purpose with the two top pieces $a$ $a$ projecting beyond the posts or standards $b$ $b$ on that end which I denominate the front for the purposes which will be hereafter mentioned. To these two top pieces and in the space between them extending in length the distance between the posts or standards, the concave $c$, Figs. 1, 2, 3 and 4 is attached by screws $d$, Figs. 1, 3, 4, passing through projections $e$, Fig. 3, on it into the top pieces and is divided longitudinally into two equal parts each forming the half of a circle which may be called the concave and bonnet. When connected, which is done by the above mentioned screws, their outer surfaces form a cylinder, and their position is longitudinal with the frame. Their inner surface forming a concavity is constructed in a peculiar manner and constitutes in part the ground for my claim to improvement. As represented at $f$, $f$, $f$, $f$, Figs. 2 and 5, longitudinal projections $g$ extend from the rear end about seven eighths of the length with notches cut in them, and are of a suitable number and a convenient distance apart.
Intersecting these projections obliquely and running spirally around the concave are a suitable number of other smooth projections $h$, Figs. 2 and 5, and the space between the termination of these projections and the front end of the concave is occupied by spiral grooves $i$, Figs. 2 and 5, which pass entirely around it and form a female screw. To the rear end of the concave extending upward and obliquely the required distance the flue $j$, Figs. 1, 2, 3, is attached, the form of which is that of an ordinary flue. At the juncture of the flue and concave on the upper side the hopper $k$, Figs. 1, 2 and 3, is attached and consisting of three sides surrounds an aperture $l$, Figs. 1 and 2, in the flue by which access is had to the concavity for the purpose of feeding. The opposite or front end of the cylinder is covered with wire gauze as represented at $m$, Figs. 2 and 4.

$n$, Figs. 1, 2, 3 and 4 represents the axle of the beater, which axle revolves in suitable boxes connected to the cross pieces of the frame. The beater consists of two wheels $o$, Fig. 2, revolving with its axle, situated one at each end of and within the cylinder and a suitable number of knives $p$, Fig. 2, running spirally in a direction opposite to that of the smooth projection $h$, and attached at each end to flanges $q$, Fig. 2, extending from the axles of the two wheels and attached to the sides. The fan $r$, Figs. 2 and 4, which is constructed in the ordinary manner, is situated in the space between the two front standards and its axle revolves in suitable boxes connected to additional crosspieces $s$, Figs. 1, 2 and 3, and is put in motion by a band passing around a pulley $t$, Figs. 1, 2 and 3, on the end of its axle and a similar one $u$, Figs. 1 and 2, on the main shaft. When the machine is put in motion (which may be done by any known power) the space between the two standards, and occupied by the fan is closed or nearly so by a casing on every side the front part of which consists of two sliding doors (represented by $v$, Fig. 3, with one drawn and the other withdrawn). This inclosure is continued up to the top of the cylinder, so that (the wire gauze above mentioned forming one part of it) the current of air produced by the revolution of the fan is forced through the wire gauze partition into the cylinder and so out at the flue on the opposite end carrying the chaff with it while the grain by the combined operation of the beaters and projections on the concave is forced to the front end where it drops through an aperture $w$, Figs. 1, 2 and 4, into its proper receptacle.

What I claim as my invention and desire to secure by Letters Patent is—

1. The structure of the inside of the cylinder being composed of the longitudinal notched projection $g$, intersected obliquely by smooth projections $h$ and the grooves $i$ running spirally around the front end of said interior.

2. And I also claim the relative positions of the hopper $k$, fan $r$, and flue $j$, all as above described and set forth.

JEDUTHAN CROSS.

Witnesses:
 JOHN W. HUBBARD,
 JACOB B. MONG.